Patented Mar. 21, 1950

2,501,445

UNITED STATES PATENT OFFICE 2,501,445

CONCENTRATED MILK FOOD PRODUCT AND PROCESS OF PREPARING SAME

Wesley H. Hoecker and Bernard W. Hammer, Orinda, Calif., assignors to Golden State Company, Ltd., San Francisco, Calif., a corporation of Delaware No Drawing. Application July 25, 1946, Serial No. 686,156

8 Claims. (Cl. 99—55)

This invention relates to a new and useful food product composed of ingredients obtained from milk, which is characterized as having the following properties; first, it is concentrated to a point productive of a plastic consistency whereby the product is spreadable, secondly it is uniform and smooth in texture, and has a viscosity which does not change appreciably with changes in temperature within the range ordinarily encountered in storage and use; thirdly, it includes substantially all of the solids of the original milk from which it is made, either with or without increased amount of butterfat; fourthly, it contains all of the lactose of the original milk in a dissolved state, or, in other words, in an uncrystallized form; and fifthly, it possesses good keeping qualities at refrigerating temperatures such as those employed for ordinary household refrigeration, particularly when a predetermined quantity of salt is added.

This invention also relates to a new and useful process according to which the novel product of this invention may be produced.

Notwithstanding the fact that it has long been recognized that milk is an exceptionally fine food for human consumption and is one containing most of the ingredients necessary to a well-balanced diet, a more extensive use of milk as a food has been prevented by the perishability of fresh milk and the difficulties involved in the production of stable milk products having satisfactory taste and keeping qualities. As a result, the greatest part of all milk produced today is consumed at or near the locations where the producing herds are situated.

Stable milk products, such as whole or skim milk powders, evaporated milk, and sweetened condensed milk, have all enjoyed good acceptance and usage in their respective fields, but it is well known that prior efforts to eliminate or reduce the water content in milk and give good keeping qualities to the finished product have, generally speaking, resulted in the development of unfavorable properties, such as caramel flavor, poor keeping qualities, or like unwanted characteristics.

Furthermore, as far as these applicants are aware, no product has been evolved which has had a plastic or spreadable consistency and which has included in its composition substantially all of the food substances contained in natural fresh milk.

Plastic or spreadable products derived from milk which heretofore have been available are butter and certain cheeses and, as to these, butter of course does not supply any appreciable quantity of solids not fat, and cheeses do not supply any appreciable quantity of those food substances which remain in and constitute the solids of whey.

It has long been the desire of investigators in the milk industry to provide a product which would make available all of the milk solids of the original milk for use as a food for human consumption, and which at the same time would have good flavor and keeping characteristics. The difficulties encountered by prior investigators may be more readily appreciated when it is realized that the creation of good keeping qualities in milk has generally required the use of heat treatments employing temperatures which inevitably have had some detrimental effect upon the natural flavor of the milk.

Furthermore, prior efforts to produce products having a plastic or spreadable consistency have proceeded along the line of eliminating that quantity of water from the milk necessary to increase the viscosity to the point where plasticity or spreadability resulted. It always occurred, however, that such water elimination would necessarily be so large that the lactose present in the milk would crystallize out of solution and exist in the product in the form of large crystals. The presence of such crystals would constitute a serious impairment of any product so made and would give a grittiness or sandiness to the product which was highly detrimental to its quality. Furthermore, exceptionally large crystals occasionally would form and constitute hard lumps in the product which the consumer would bite down on, greatly to his displeasure. In consequence, all prior efforts have resulted in products which are either sufficiently high in water content to dissolve all of the lactose present and in such state were relatively liquid and flowable, or have had the whey and lactose eliminated therefrom altogether. Accordingly, the only spreadable product or products made from milk having a plastic consistency which heretofore have been produced are butter and those, such as cheese, made from the curd of milk. Cheeses, of course, do not contain the water-soluble solids which are discarded with the whey. It is well known that the whey which is thus discarded contains important food elements, including a small portion of the original milk protein, water soluble minerals and vitamins, as well as a large quantity of lactose.

From what has been said, it will be appreciated that heretofore it has not been considered possible to produce a milk product containing substantially all of the ingredients of the original milk, and which at the same time is plastic so as to be spreadable on crackers or bread, and which also is free from lactose crystals and has a smooth and uniform texture or consistency.

It is, therefore, an object of this invention to provide a product having these characteristics and at the same time to provide a highly practical, simple, and inexpensive procedure by which such a product may be produced.

A further object is to provide a product of the type described which has good keeping qualities, that is to say, one which is substantially free from bacteria which will damage the product at refrigerated temperatures, especially when a small amount of salt is added.

It is a further object to provide a new and improved milk product of the type referred to, which is non-flowing or plastic at ordinary temperatures, has a smooth, uniform texture as well as unique spreading characteristics, and has improved nutritional value due to the retention of all the lactose, protein, minerals, vitamins, and other ingredients of the original milk, and finally is free from a cooked flavor as well as the tendency to spoil at refrigerated temperatures.

It is a further object of this invention to provide a novel process for carrying out the steps for producing the novel product above referred to.

These and other objects not specifically enumerated are contemplated for this invention, as will readily appear to one skilled in the art as the following description proceeds. It is to be understood that the product and procedure described herein relate to only one embodiment of the invention and are given only by way of illustration. The invention as defined in the appended claims is to be given the broadest possible interpretation permitted by the prior art.

One of the important features of novelty which characterizes this invention is found in the fact that the finished product contains sufficient water to maintain the lactose present in a dissolved state, and yet the product is plastic or spreadable in consistency rather than flowable or liquid as would ordinarily be expected. For instance, an excellent plastic or spreadable product is produced when the total solids, including fat and non-fat, amounts to about 50% of the total weight of the product. Satisfactory products can be made when the water content is as high as 60% or 70% by weight of the total weight of the product, and then again the water content can be reduced as low as approximately 30% or 40% of the total weight of the product. A 50-50 ratio by weight of water to total solids is preferable, however.

The thickening of the product to the point of producing the desired viscosity or plasticity is accomplished by adjusting the butterfat content to the solids not fat and subsequently subjecting the entire product to an homogenizing action. It is preferable to increase the butterfat content of the product to a point beyond the ratios normally existing in whole milk and excellent results have been obtained when the ratio of the butterfat to the solids not fat is approximately 1 to 1.

The maximum amount of fat that should be utilized is that which can be homogenized with the solids not fat to produce a thoroughly homogenized product. It is obvious that as the butterfat is increased the solids not fat is decreased if the ratio of total solids to water is maintained. If the solids not fat are decreased too greatly by the addition of butterfat, then there will not be sufficient non-fatty solids present to coat the fat globules in the homogenized mass. If an adequate coating film is not produced, a good homogenizing result will not be realized and the resulting product is somewhat greasy and devoid of the improved texture or spreadable property which characterizes the product of this invention.

The minimum amount of fat that should be utilized is that which increases the ratio of solids not fat to the water (which constitutes a fixed portion of the total weight of the product) to the point where the lactose present will no longer remain in solution and thus start to crystallize out and exist in the finished product in the form of crystals. Ordinarily speaking, the butterfat may be employed in quantities as high as approximately one and three-quarters parts by weight to each part of solids not fat present, and then again it may be employed in quantities as low as approximately one part of fat to each two parts of solids not fat.

When the water content is increased over the preferred 50–50 ratio, less fats can be employed because a corresponding increase in solids not fat will be satisfactorily taken care of by the increased amount of water present, with the result that undesirable crystallization will not occur. For instance, with a product composed of 40% total solids or 60% water, the fat content can be reduced to .6 of one part for each part by weight of solids not fat. On the other hand, when a product is composed of 30% total solids or 70% water, the fat content can be reduced with good results to a quantity as low as approximately .5 of one part for each part of solids not fat.

It is obvious that the invention is not to be restricted to the exact proportions either with respect to the quantity of water to total solids utilized, or to the quantity of fat to the non-fat solids employed, provided only that the above limitations are followed, namely, that sufficient solids not fat are present to thoroughly coat the fat present and thus produce a product of good consistency and texture, and also that there is not so much solids not fat present as to cause a crystallization of the lactose present.

As the first step in the production of the product of this invention, it is necessary to produce a concentrated product having that limited quantity of water present which is preferred for the finished product. By way of illustration, we may assume that the product preferred will be composed of 50% water and 50% solids. The first step, therefore, will be to produce this concentrated product, bearing in mind that the product must also have the selected and preferred content in regard to its fat and non-fat solid constituents.

The invention is not to be restricted to any particular method of producing the concentrated product as the same may be produced by any one of a number of satisfactory ways. For instance, whole milk may be enriched with butterfat to adjust the ratio of fat to solids not fat to the desired value, and thereafter the product subjected to evaporation or other suitable concentrating procedure until the solid content of the milk has been increased to the desired point. Any suitable evaporating equipment may be employed, and the evaporation may be carried out in a number of stages in accordance with established practice. With multiple stage treatment, the final stages may be conducted under reduced pressure and continued until the final concentration is brought to the desired level. In fact, this method is preferred since vacuum evaporation is generally carried out at temperatures within the range of from approximately 110° F. to 140° F., which assures that the material is not seriously discolored or otherwise affected to the detriment of the odor, flavor, or the general quality of the milk concentrate.

It is to be understood, of course, that other methods of concentrating the original milk employed may be utilized, such as, for instance, adding dry or concentrated milk to ordinary whole milk. By adding concentrated products in sufficient quantity to whole milk, the ratio of solids to the water content can be adjusted to any desired value. Also, a desired ratio between the fat and solids not fat can also be adjusted by introducing fat in the necessary quantity.

The next step in the production of the product is to subject the same to a pasteurizing treatment. The temperature utilized for this treatment is generally in the neighborhood of 175° F., or at some suitable temperature within the range of approximately 150° F. and approximately 190° F. The heat treatment is continued at the selected temperature for a period of approximately one to two minutes, or for a period of from approximately one-half a minute to approximately ten minutes or more depending on the temperature employed. In general, the length of the heating time is considerably reduced as the temperature is increased. The heating of the product may be readily brought about by using steam jacketed kettles or suitable continuous flow steam jacketed heating equipment.

The product is next treated to change its consistency to a plastic, flowable mass, and whereas that may be accomplished as hereinafter stated by homogenization, it may be desirable in certain instances to utilize a water binding agent. If such agent is to be employed, it is preferable to add the same after the above-described concentration step and prior to pasteurization. This may be done either by adding the agent in a solid form or in a dissolved state. When the concentrate is warm it has been found advantageous to add the agent in solid form rather than to add a solution. The addition of a solution is to be avoided when possible as an unwanted diluting of the product results.

Suitable water binding agents for this purpose are algin, gelatine, pectin, dariloid, carob bean gum, gum tragacanth, gum karaya, etc. The amounts of these water binding agents which may be added may vary considerably depending upon the specific conditions to be met, such as solids concentration, ratio of fats to solids not fat, the preferred consistency, and like considerations, and in practice the amounts to be added may be as low as .03% by weight. It is preferable, however, to employ such agents in quantity between approximately 0.1 and 0.5%, based on the weight of the product.

The concentrated, pasteurized product is next subjected to the action of a high speed mixer or homogenizer. This treatment not only has the effect of dispersing fat but also acts upon the concentrated proteins and other constituents of the milk solids. When the ratio of fats to solids not fat is maintained according to the above-stated ratios, the homogenizing action serves to produce a novel and highly improved texture not reproducible by treating the fat and solids not fat separately and then thoroughly mixing the same.

As above stated, the fat content is increased over that present in fresh whole milk, and when there is sufficient protein or other solids not fat present to thoroughly coat the fat globules, a plastic, spreadable mass results which sets at ordinary temperatures, and which, though easily spreadable, is not greasy or oily. Furthermore, the product is not appreciably affected by reasonable changes in temperature ordinarily encountered in use through atmospheric temperature variations.

The homogenization of the concentrate is preferably carried out by forcing the heated concentrate through a shearing valve or similar device at a pressure within the range of from approximately 500 pounds per square inch to approximately 3500 pounds per square inch.

The next step in the operation relates to the packaging of the product, which involves the use of suitable containers which are filled while the pasteurized and homogenized product is still hot, and in a flowable condition. If the containers are contaminated with bacteria, such bacteria are destroyed by the heat of the product as the same is introduced. When the containers thus packed are sealed, it is found that the product has excellent keeping qualities when refrigerated. Furthermore, the product, after being placed in the containers and allowed to cool, thickens considerably with the drop in temperature and sets in the container to a plastic, cohesive mass of smooth and uniform texture, having little resistance to shearing as when sheared by a spreading knife. As above stated, it resists change in viscosity at ordinary temperatures and is a product which has exceptionally good keeping qualities at refrigerating temperatures. The high degree of resistance to spoilage is due to the fact that the destructive enzymes have been inactivated and the bacteria, yeasts and molds which cause spoilage at refrigerated temperatures have been destroyed. All thermophilic bacteria that are also thermoduric and which, therefore, escape destruction when the pasteurizing treatment is given, are found to be readily controllable for the reason that the product is plastic and, as such, provides a medium which, when stored for relatively long periods under conditions of refrigeration or freezing, present only a medium which is unfavorable to the growth of destructive organisms.

By way of specific example, the invention may be carried out as follows: Milk of approximately 12.5% total solids content may be concentrated in a vacuum evaporator, such as the evaporator disclosed in Peebles and Manning Patent No. 2,090,985, and the evaporation carried out until the solids content of the concentrated product is approximately 51% by weight. The concentrate may then be mixed with sufficient butterfat to raise the ratio of butterfat to milk solids not fat to a value of approximately 1 to 1. To the concentrate 0.1% by weight of carob bean gum may next be added. The mixture is then heated to and held at approximately 175° F. for a period of approximately one minute. The heated mixture is then homogenized before any appreciable drop in temperature occurs. The homogenization is carried out by pumping the concentrate through a conventional homogenizing or shearing valve at a pressure of approximately 2000 pounds per square inch. When the product emerges from the valve it is hot and flowable and, as such, it is packaged in sterilized containers before the product cools or sets.

The product which is thus produced may have other ingredients added to it or mixed with it at any desired stage in the process. For instance, acids such as acetic, propionic, lactic and similar acids may be added; or as other additions may be mentioned ketones such as diacetyl, methyl-N-amyl ketone and similar ketones; inorganic salts such as sodium chloride and similar salts; flavoring matter such as cheddar, limburger, blue or other cheeses; vegetable flavoring such as pickles, olives, chives, pimientoes; as well as fruit flavoring such as pineapple or the like; and vitamines including both the water and oil soluble vitamines. Among the water soluble vitamines, may be mentioned; B1, B2, B6, and C, and among the oil soluble vitamines may be mentioned A, D and E.

What is claimed is:

1. The process of producing a product derived from milk, which is free from cooked flavor, has good keeping qualities at refrigerating temperatures, has a plastic consistency rendering it readily spreadable, has a uniform and smooth texture, and is resistant to any substantial change in viscosity throughout the range of temperatures ordinarily encountered in storage and use, which comprises concentrating whole milk to an extent to produce a total solids content, including butterfat to be subsequently added, of approximately 40% to 70% by weight, adding butterfat in quantity to adjust the ratio of butterfat to milk solids not fat, to a value within the range of approximately one-half of one part to approximately one and three-fourths parts of fat, for one part of solids not fat, heating the concentrated mixture to a temperature of from approximately 150° F. to approximately 190° F. for a period of from approximately one-half a minute to approximately thirty minutes, and then homogenizing said hot mixture before any substantial drop in temperature occurs at a pressure of from approximately 500 pounds per square inch to approximately 3500 pounds per square inch.

2. The process of claim 1, further characterized by the additional step of sealing the concentrated mixture so prepared in containers while the same is still hot.

3. The process of claim 1, further characterized by the step of introducing into said concentrated mixture from 0.03% to 0.5% by weight of a water binding agent prior to the homogenizing treatment.

4. The process of claim 1, further characterized by the additional steps of adding salt to the concentrate and then sealing the same in sterile containers while it is still hot.

5. The process of producing a product derived from milk, which is free from cooked flavor, has good keeping qualities at refrigerating temperatures, has a plastic consistency rendering it readily spreadable, has a uniform and smooth texture, and is resistant to any substantial change in viscosity throughout the range of temperatures ordinarily encountered in storage and use, which comprises concentrating whole milk to an extent to produce a total solids content, including butterfat to be subsequently added, of approximately 50% by weight, adding butterfat in quantity to adjust the ratio of butterfat to milk solids not fat to a value of approximately one part of fat for one part of solids not fat, heating the concentrated mixture to a temperature of approximately 150° F. to approximately 190° F. for a period of from approximately one-half a minute to approximately thirty minutes, and then homogenizing said hot mixture before any substantial drop in temperature occurs at a pressure of from approximately 500 pounds per square inch to approximately 3500 pounds per square inch.

6. The process of claim 5, further characterized by the additional step of sealing the concentrated mixture so prepared in containers while the same is still hot.

7. The process of claim 5, further characterized by the step of introducing into said concentrated mixture from 0.03% to 0.5% by weight of a water binding agent prior to the homogenizing treatment.

8. The process of claim 5, further characterized by the additional steps of adding salt to the concentrate and then sealing the same in sterile containers while it is still hot.

WESLEY H. HOECKER.
BERNARD W. HAMMER.

REFERENCES CITED

The following references are of record in the file of this patent:

UNITED STATES PATENTS

| Number | Name | Date |
| --- | --- | --- |
| 1,024,009 | Kronenberger | Apr. 23, 1912 |
| 1,591,714 | Low et al. | July 6, 1926 |
| 2,052,028 | Harris et al. | Aug. 25, 1936 |
| 2,085,134 | Wendt | June 29, 1937 |
| 2,131,064 | Musher | Sept. 27, 1938 |